US008458508B2

(12) United States Patent
Misaka et al.

(10) Patent No.: US 8,458,508 B2
(45) Date of Patent: *Jun. 4, 2013

(54) INFORMATION PROCESSING DEVICE WHICH SPECIFIES A WAITING TIME UNTIL EXECUTION OF A GIVEN EVENT AND MAKES A SYSTEM CALL

(75) Inventors: Satoshi Misaka, Kokubunji (JP); Shinjiro Yamada, Tokorozawa (JP)

(73) Assignee: Renesas Electronics Corporation, Kanagawa (JP)

( * ) Notice: Subject to any disclaimer, the term of this patent is extended or adjusted under 35 U.S.C. 154(b) by 241 days.

This patent is subject to a terminal disclaimer.

(21) Appl. No.: 12/900,654

(22) Filed: Oct. 8, 2010

(65) Prior Publication Data

US 2011/0029802 A1 Feb. 3, 2011

Related U.S. Application Data

(63) Continuation of application No. 11/878,844, filed on Jul. 27, 2007, now Pat. No. 7,836,325, which is a continuation of application No. 10/694,849, filed on Oct. 29, 2003, now Pat. No. 7,269,677.

(30) Foreign Application Priority Data

Oct. 29, 2002 (JP) ................................. 2002-313617

(51) Int. Cl.
G06F 1/14 (2006.01)
G06F 1/00 (2006.01)
G06F 13/24 (2006.01)

(52) U.S. Cl.
USPC ............................ 713/502; 713/500; 710/260

(58) Field of Classification Search
USPC .................................................. 713/500, 502
See application file for complete search history.

(56) References Cited

U.S. PATENT DOCUMENTS 5,244,350 A 9/1993 Yang
5,543,697 A 8/1996 Carobolante et al. .......... 318/594
(Continued)

FOREIGN PATENT DOCUMENTS

JP 629418 1/1987
JP 1187619 7/1989
(Continued)

OTHER PUBLICATIONS

Masayoshi, Task wait time management device for computer system, Jun. 16, 1995, Japanese Patent Office, English translation of JP 07-152588, pp. 8.*

Primary Examiner — Suresh Suryawanshi
(74) Attorney, Agent, or Firm — Mattingly & Malur, PC

(57) ABSTRACT

An information processing device having low power consumption without affecting interruption request response speed. The device specifies a waiting time until execution of a given event and makes a system call and includes a first timer circuit for a first cycle; a second timer circuit for a second cycle shorter than the first cycle; a timeout supervisor which stores the waiting time; and a first cycle supervisor which stores waiting time until the next interruption request. The timeout supervisor stores the time calculated by subtraction of the waiting time stored in the first cycle supervisor from that in the timeout supervisor upon an interruption request from the first timer; and if the waiting time stored in the timeout supervisor is shorter than the first cycle, the second cycle time is subtracted from the time stored in the timeout supervisor upon an interruption request from the second timer circuit.

4 Claims, 16 Drawing Sheets

| U.S. PATENT DOCUMENTS | | | |
|---|---|---|---|
| 6,108,723 A | 8/2000 | Simms et al. | 710/35 |
| 6,317,697 B1 | 11/2001 | Yoshikawa et al. | 702/63 |
| 6,418,150 B1 * | 7/2002 | Staats | 370/503 |
| 6,543,000 B1 | 4/2003 | Wright | 713/500 |
| 6,876,601 B2 | 4/2005 | Li et al. | |
| 6,879,537 B2 * | 4/2005 | Takahashi et al. | 365/222 |
| 6,971,036 B2 | 11/2005 | Freed | 713/322 |
| 7,058,841 B2 | 6/2006 | Li | |
| 7,269,677 B2 | 9/2007 | Misaka et al. | |

| FOREIGN PATENT DOCUMENTS | | |
|---|---|---|
| JP | 01276239 | 11/1989 |
| JP | 405342021 | 12/1993 |
| JP | 406035716 | 2/1994 |
| JP | 407006037 | 1/1995 |
| JP | 7152588 | 6/1995 |
| JP | 11355198 | 12/1999 |

* cited by examiner

INFORMATION PROCESSING DEVICE WHICH SPECIFIES A WAITING TIME UNTIL EXECUTION OF A GIVEN EVENT AND MAKES A SYSTEM CALL

The present application is a continuation application of Ser. No. 11/878,844, filed Jul. 27, 2007, which is a continuation of application Ser. No. 10/694,849, filed Oct. 29, 2003 (now U.S. Pat. No. 7,269,677), the contents of which are incorporated herein by reference.

FIELD OF THE INVENTION

The present invention relates to an information processing device and an operating system.

BACKGROUND OF THE INVENTION

FIG. 16 shows the configuration of a conventional wireless communication device disclosed in JP-A No. 355198/1999.

As illustrated in FIG. 16, the device includes: a central processing unit CPU (hereinafter called the processor) 1; a frame synchronous circuit SYN (hereinafter called the synchronous circuit) 2; a receiver circuit RCV 3; a register (control means) REG 4; a switching circuit SWC 5; an oscillator OSC 6 which outputs high speed clock CK; a real time clock RTC with a timer function which is used as a clock function of the wireless communication device, RTC (hereinafter called RTC) 7; an input/output circuit I/O (hereinafter called I/O) 8; a timer TIM 9; an interruption circuit INTC 10; and a bus for receiving and transmitting addresses, data and, control data, 11.

The switching circuit SWC 5 selects either clock CK1 outputted from the oscillator OSC 6 or clock CK2 outputted from RTC 7 according to control data from the processor CPU 1 which is written and stored in the register REG 4, and supplies the selected clock to the processor CPU 1, synchronous circuit SYN 2, and register REG 4.

The timer TIM 9 operates all the time according to clock CK2 outputted from RTC 7 and in the intermittent mode (sleep mode) after paging channel reception, time to supply clock CK2 outputted from RTC 7 is set on the timer TM 9 by the processor CPU 1. As the timer TIM 9 times out, it outputs an interruption control signal to the interruption circuit INTC 10 to bring the interruption circuit INTC 10 into an interruption status.

When the interruption circuit INTC 10 receives an interruption control signal from the timer TIM 9 or an interruption request which is keyed in by the user via the I/O 8, it notifies the processor CPU 1 of occurrence of the interruption request. In other words, the interruption circuit INTC 10 outputs the interruption request to the processor CPU 1.

After a timer value is set on the timer TIM 9 by the processor CPU 1, the processor CPU 1 writes control data into the register REG 4. According to the control data stored in the register REG 4, the switching circuit SWC 5 switches clock CK1 outputted from the oscillator OSC 6 to clock CK2 outputted from RTC 7 and sends clock CK2 to the processor CPU 1, synchronous circuit SYN 2, register REG 4 and so on. In this way, the processor CPU 1, synchronous circuit SYN 2, register REG 4, and so on operate in accordance with clock CK2. Furthermore, the oscillator OSC 6 stops operating according to control data written in the register REG 4.

When the processor CPU 1 receives an interruption request from the interruption circuit INTC 10, it decides which circuit has outputted the interruption request. If it decides that the request has come from a circuit other than the timer TIM 9, it processes the request in accordance with clock CK1 and waits for arrival of a next interruption request.

If the processor CPU 1 decides that the received interruption request has come from the timer TIM 9, then it writes control data in the register REG 4. The switching circuit SWC 5 switches clock CK2 from RTC 7 to clock CK1 from the oscillator OSC 6 according to the control data written in the register REG 4. The clock CK1 thus selected is sent to the processor CPU 1, synchronous circuit SYN 2, register REG 4 and so on.

Patent Document 1

JP-A No. 355198/1999

Prior to filing this application, the inventor of the present invention et al reviewed the above prior art. Since wireless communication equipment includes information processing devices incorporating a function of electronic mail, a browser, an audio visual recorder/players, and the like, the inventor et al also reviewed application of the wireless communication device as disclosed in Patent Document 1 to an information processing device. When the conventional wireless communication device is used for an information processing device, a memory MEM 21 should be added to the wireless communication device as shown in FIG. 16 and the memory MEM 21 should contain an operating system OS (hereinafter called the "OS"). The OS 22 performs time supervision and management of the information processing device by making the timer TIM 9 issue an interruption request in each desired cycle.

The inventor et al have found that there are two problems to be solved regarding a cyclic interruption request from the timer TIM 9 in the information processing device which uses the wireless communication device as shown in FIG. 16 or a conventional wireless communication device.

The first problem is a phenomenon that when a cyclic interruption request is made in the standby power reduction mode, the mode is cancelled in accordance with the interruption request cycle and clock CK1 and clock CK2 are supplied to the processor CPU 1, resulting in current consumption. This phenomenon is explained below referring to FIG. 17.

FIG. 17 shows current consumption 41 of the processor CPU 1 in different operating modes. In this graph, 42 represents a timer interruption request mode and 43 a standby power reduction mode. When the OS 22 has a multi-task function, arrangements are made to insert the standby power reduction mode in the infinite loop of a lowest-priority task. In other words, it is to assume an idle state in which clock CK1 is supplied to the processor CPU 1, namely information processing is possible but not performed for a while, or laxity time before the deadline. The duration of the timer interruption request mode 42 which lasts from a timer interruption until the next timer interruption is called timer interruption duty.

If the above-mentioned lowest-priority task is started in the idle state in order to prevent wasteful current consumption, the timer TIM 9 issues an interruption request (timer interruption request mode 42) to cancel the standby power reduction mode 43, which supplies clock CK1 to the processor CPU 1 and starts the CPU 1; as a consequence, power consumption 41 increases in a situation where current consumption should be reduced. This phenomenon can be suppressed by lengthening the timer cycle 44 to decrease the number of interruption requests made by the timer 9, lengthen the standby power reduction time 43 and thus reduce current consumption 41.

However, the OS 22 performs time supervision and management while internally counting with a system clock 24 at each cyclic interruption request. Therefore, it has been found that when the timer cycle 44 of the timer TIM 9 is lengthened, time accuracy worsens in dequeuing a queued task within a time period shorter than the timer cycle 44 due to timeout. In other words, when an attempt is made to reduce current consumption 41, time accuracy worsens; and on the other hand, when an attempt is made to improve time accuracy, current is consumption 41 increases.

The second problem is a phenomenon that an interruption from the timer TIM 9 which occurs in every timer cycle 44 conflicts with an interruption request from the I/O circuit 8.

Especially when time management is prioritized, namely the level of an interruption request from the timer TIM 9 is high, the interruption circuit INTC 10 first receives a cyclic interruption request from the timer TIM 9 and just after processing the request, receives an interruption request from the I/O circuit 8 to perform I/O processing. As a result, the response to interruption requests is slow.

SUMMARY OF THE INVENTION

The present invention is briefly outlined below by giving a typical application example. According to one aspect of the present invention, an information processing device which specifies a waiting time until execution of a given event and makes a system call, comprises:

a first timer circuit which is set for a first cycle;

a second timer circuit which is set for a second cycle which is shorter than the first cycle;

a timeout supervisor which can store the waiting time when the system call is made; and a first cycle supervisor which can store a time until the next interruption request from the first timer circuit when the system call is made. Here, the timeout supervisor stores the time as a result of subtraction of the time stored in the first cycle supervisor from the time stored in the timeout supervisor upon an interruption request from the first timer; and if the time stored in the timeout supervisor is shorter than the first cycle, the second cycle time is subtracted from the time stored in the timeout supervisor upon an interruption request from the second timer circuit.

More preferably, if the time stored in the timeout supervisor is longer than the first cycle, an interruption request from the second timer circuit should be disabled, and if the time stored in the timeout supervisor is shorter than the first cycle, an interruption request from the second timer should be enabled. More preferably, the first cycle supervisor should enable input of the time duration of the first cycle.

BRIEF DESCRIPTION OF THE DRAWINGS

Preferred embodiments of the present invention will be described in is detail based on the following, wherein.

DETAILED DESCRIPTION OF THE PREFERRED EMBODIMENTS

Figure 1:
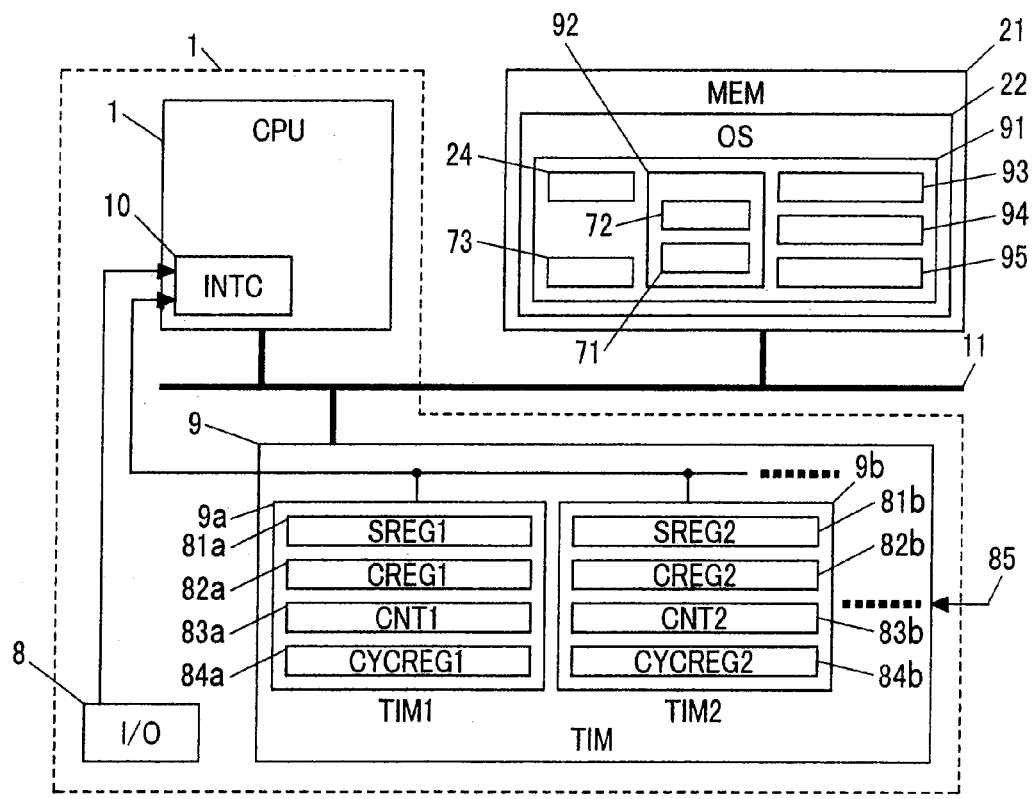
FIG. 1 shows a typical embodiment of the present invention.

First of all, the concept of the present invention will be described referring to FIGS. 1 and 2. FIG. 1 shows an embodiment of the present invention which has a basic structure. As shown in the figure, it includes a processor CPU 1, a plurality of timers TIM 9, a memory MEM 21 with an OS 22, an I/O 8, and a bus 11. It is also possible to consider that a block composed of the to processor CPU 1, timers TIM 9, I/O 8, and bus 11 constitutes the processor CPU 1, and the processor CPU 1 (the block) and the memory MEM 21 are connected via the bus 11, making up a circuit.

The plural timers TIM 9 include a first timer TIM1 9a and a second timer TIM2 9b. The first timer TIM1 9a includes a status register SREG1 81a, a control register CREG1 82a, a counter CNT1 83a, and a cycle register CYCREG1 84a. The second timer TIM2 9b has the same composition as the first timer TIM1 9a. Clock CK 85 is a clock signal from an oscillator. The timers TIM 9 constantly receive clock CK2 from RTC 7; but in some applications it may receive not only clock CK2 from RTC 7 but also clock CK1 from an oscillator OSC 6.

The status registers SREG1, SREG2, 81, have information on the internal status of the respective timers including whether or not counters CNT1, CNT2, 83, are underflowing and whether timer interruption is enabled or disabled.

The control registers CREG 82 have information on the respective timers to specify whether to enable or disable timer interruption while the counters CNT 83 are underflowing and the division ratio for clock CK 85 required for timer operation, and permit cycle counting by the timers and so on. The status registers SREG and control registers CREG can be set through an external device.

The counters CNT 83 have the function of counting down the initial setting synchronously with the respective timers at the division ratio for clock CK 85 specified by the control registers 82. The counters 83 may be either down-counters or up-counters. If they are up-counters, they have the function of counting up (addition).

The cyclic registers CYCREG 84 have information on the respective timers to specify the length of the cycle in which interruption occurs during initialization or while underflowing (or overflowing if the counters are up-counters).

FIG. 1 also shows an OS time manager 91 as a function of the OS 22. The OS time manager 91 includes a task data control table (hereinafter called TCB) manager 92, a timeout request issue processor 93, a first timer interruption processor 94, a second timer interruption processor 95, a first cycle supervisor 72, and a system clock 24. The TCB manager 92 includes a timeout supervisor 71.

Figure 2:
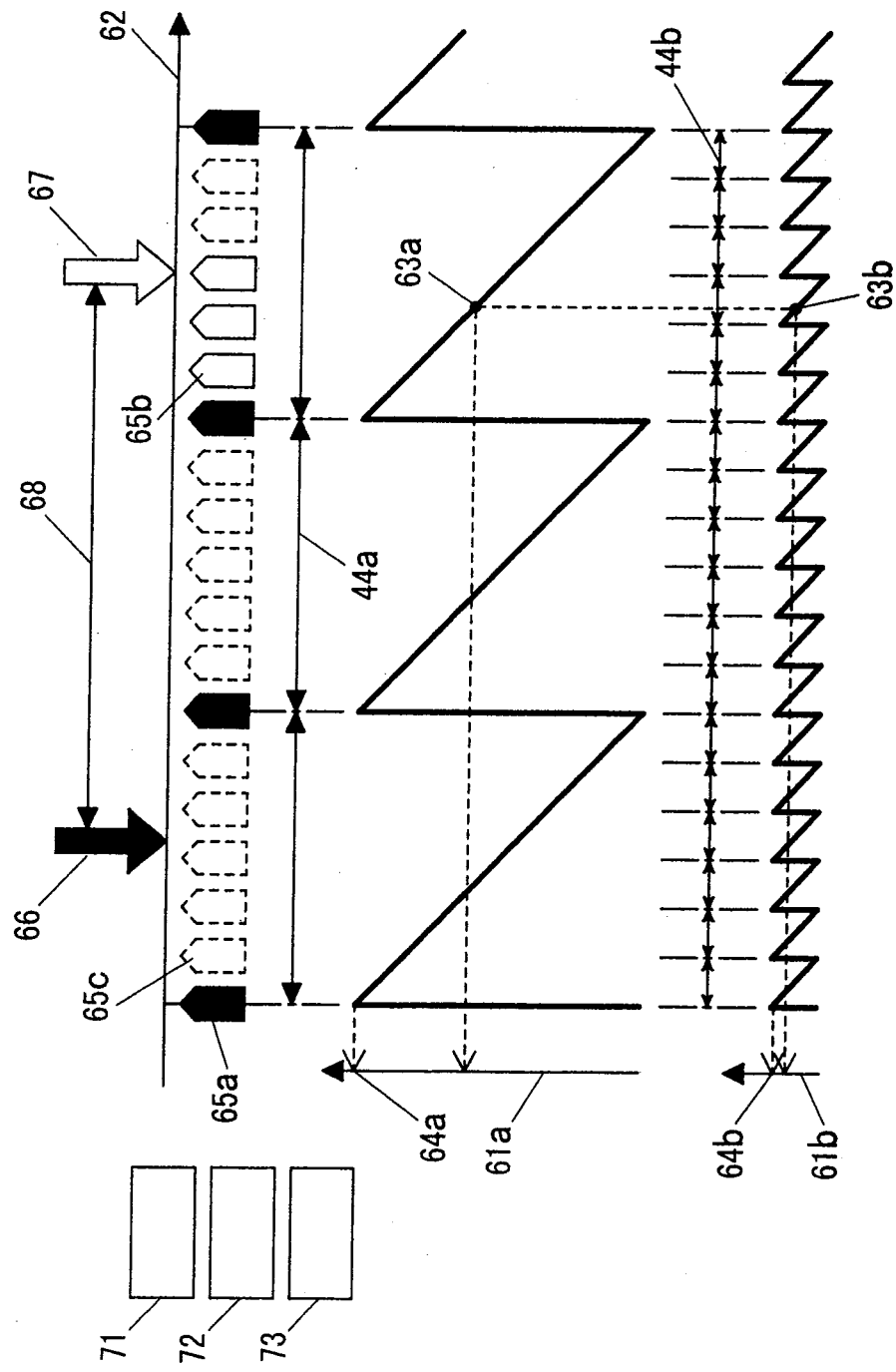
FIG. 2 illustrates the problems to be solved by the present invention.

Referring to FIG. 2, the concept of the present invention is described next. Shown in FIG. 2 are counter axis 61, time axis 62, counter value 63, cycle setting 64, interruption 65, timeout request issue time 66, timeout time 67, timeout request time duration 68, a timeout supervisor 71, a first cycle supervisor 72, and a time supervision rate storage 73.

In the graph, for the first timer TIM1 9a, 44a represents a first timer cycle, 63a a counter value, 64a a cycle setting, and 65a interruption; and for the second timer TIM2 9b, 44b represents a second timer cycle, 63b a counter value, 64b a cycle setting, and 65b interruption.

The timeout supervisor 71, first cycle supervisor 72, and time supervision rate storage 73 are located inside the memory 21 though not so limited. The values stored in the timeout supervisor 71, first cycle supervisor 72 and the like correspond to the counter values in the first timer and second timer. These values are equivalent to the time durations calculated by multiplying the cycle of clocks entering the first and second timer by the above counter values. Thus, the timeout supervisor 71 and first cycle supervisor 72 may be considered to store corresponding time durations respectively.

First, at the time of initialization, the OS 22 sets the timers TIM 9 in a way that the first timer cycle 44a is an integral multiple of the second timer cycle 44b; and the quotient of the first timer cycle 44a divided by the second timer cycle 44b is stored in the time supervision rate storage 73. In addition, the status register SREG2 81b of the second timer TIM2 9b is set so as to disable interruption 65b from the second timer TIM2 (9b) only. Then, at the timeout request issue time 66 when a timeout request is issued, the OS 22 stores the timeout request time duration 68 in the timeout supervisor 71.

Each time timer interruption from the first timer TIM1 9a occurs, the first timer cycle 44a is subtracted from the value stored in the timeout supervisor 71 and the resulting value is stored in the timeout supervisor 71 again.

When the value stored in the timeout supervisor 71 becomes smaller than the first timer cycle 44a, timer interruption from the second timer TIM2 9b is enabled and the first timer cycle 44a is set on the first cycle supervisor 72.

Each time timer interruption from the second timer TIM2 9b occurs, the second timer cycle 44b is subtracted from the values stored in the timeout supervisor 71 and first cycle supervisor 72 respectively and the resulting values are respectively stored in the timeout supervisor 71 and first cycle supervisor 72 again.

When the value stored in the timeout supervisor 71 becomes zero or less, it is timeout time and a timeout request can be met.

In the above case, the longer or first timer cycle 44a and the shorter or second timer cycle 44b are used; and the first timer cycle 44a is used to make time supervision roughly and control interruption 65, and the second timer cycle 44b is used to make time supervision accurately and thus reduce current consumption attributable to timer interruption in the processor 1 in the standby power reduction mode while maintaining time supervision accuracy. In other words, the present invention is achieved as follows: when measuring the time duration from the end of the first event to the start of the second event, first, counting takes place on the basis of the longer (first) cycle, and when the remainder time becomes shorter than the first cycle, counting takes place on the basis of the shorter (second) cycle.

For example, let's assume that the first cycle and second cycle for a timer interruption request are 10 msec and 1 msec respectively; the conventional timer interruption request cycle 44 is 1 msec; current consumption 46 for an interruption request is 150 mA; and current consumption in the standby power reduction mode is 35 mA. It can be estimated that if TMU interruption duty is 1%, 5%, 10%, and 15%, the reduction ratio of current consumption is approx. 2%, 12%, 18%, and 25%, respectively. Therefore, this approach is effective in extending the service life of batteries in mobile phones and mobile terminals or reducing the heat generated by processors.

Similarly, when timer interruption is decreased, the occupancy rate for processing by the OS 22 is decreased and the OS 22 is available for other tasks (interruptions).

Figure 3:
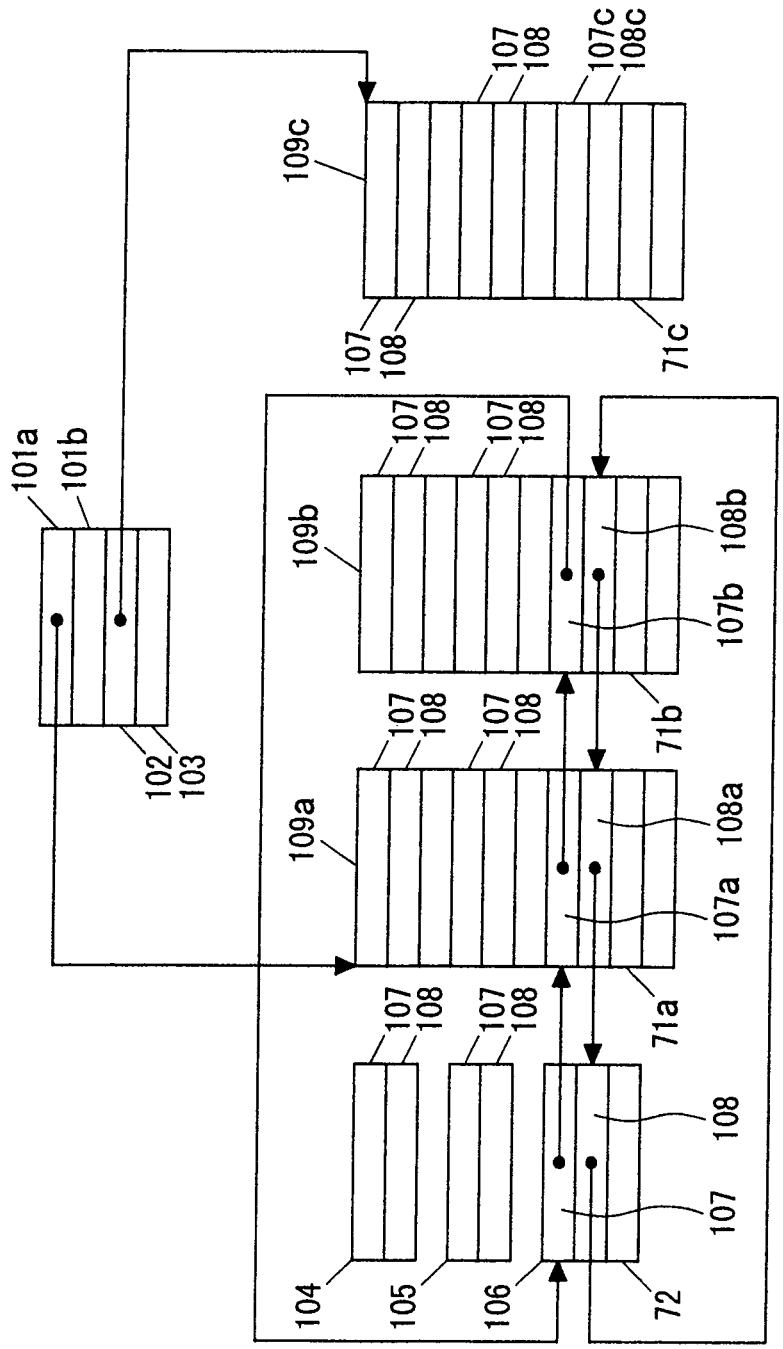
FIG. 3 illustrates how a device according to the present invention operates.

Next, the processing sequence according to the present invention will be described in detail referring to FIGS. 3 to 12. FIG. 3 shows the TCB manager 92. For example, the TCB manager includes processing pointers 101, an insertion pointer 102, a temporary storage 103, a ready queue header 104, a wait queue header 105, a timer queue header 106, a forward pointer 107, a backward pointer 108, and a single TCB or plural TCBs 109. There are as many TCBs as tasks which the OS 22 generates and drives. In this embodiment, there are three tasks (TCB 109a, TCB 109b, and TCB 109c). The timer queue header 106 is composed of a forward pointer 107, a backward pointer 108, and a first cycle supervisor 72. For simplification of the explanation, it is assumed that TCB 109a times out first, TCB 109b times out next and TCB 109c is a newly generated task.

TCBs (109a, 109b, 109c) include plural forward pointers for different purposes 107, backward pointers 108, and timeout supervisors 71. The forward pointer 107 of the timer queue header points the memory address of the forward pointer 107a of TCB (109a) of the task which times out earliest to cancel a queued task. The forward pointer of TCB 109a points the memory address of the forward pointer 107b of TCB (109b) of the task which times out next. The backward pointer 108b for the pointed TCB 109b points the memory address of the backward pointer 108a of TCB (109a) of the task which is dequeued by the last timeout. Hence, the forward pointer 107 of the timer queue header 106 points TCB (109a) of the task which times out earliest; on the other hand, the backward pointer 108 points TCB (109c) of the task which times out latest. In short, the TCB manager 72 makes a two-way list of TCBs 109 with the timer queue header 106 at the starting point (sentinel).

The timeout supervisor 71 stores the remainder time for TCB 109 which is to time out after timeout of TCB 109 of the last task linked with the two-way list. In other words, the remainder time stored in the timeout supervisor 71b indicates the remainder time since just after dequeuing of TCB 109a until its timeout; and the remainder time stored in the timeout supervisor 71c indicates the remainder time since just after dequeuing of TCB 109b until its timeout. For TCB 109, a two-way list is made in the order of task priority with the ready queue header 104 at the top and a two-way list is made on the basis of FIFO (first in first out) with the wait queue header 105 at the top.

The processing pointers 101 point the memory address of TCB 109 being processed currently. During initialization, the OS time manager 91 is set so that the processing pointers 101 point the same address as the timer queue header 106. For simplification of the explanation, it is here assumed that the timer queue header 106 points TCB 109a as shown in FIG. 3. The insertion pointer 102 points the memory address of the new TCB 109c. The time supervision rate storage 73 stores the quotient of the value of the first timer cycle 44a divided by the value of the second timer cycle 44b.

Figure 4:
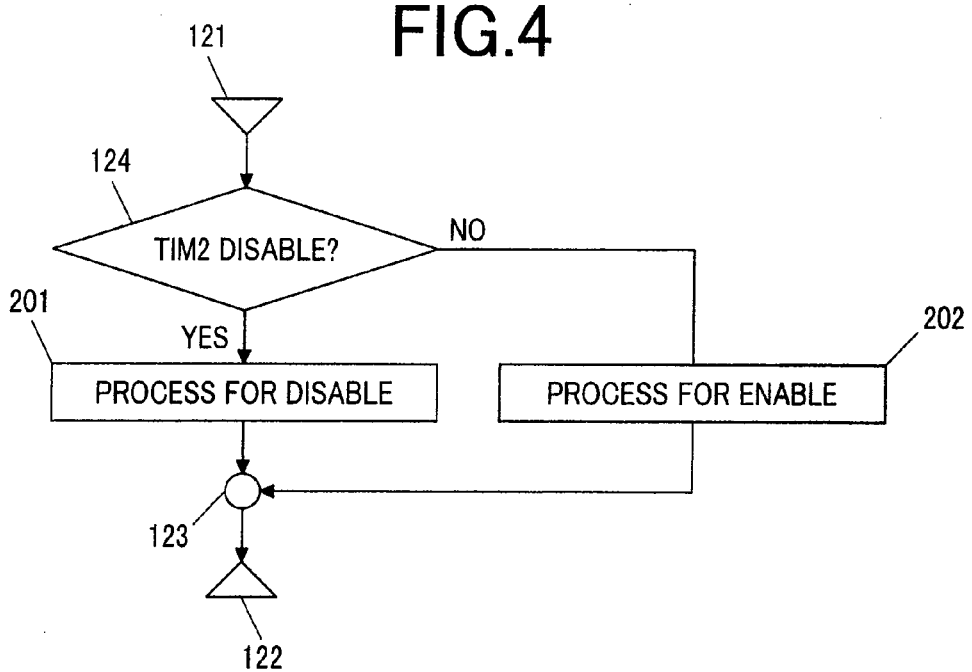
FIG. 4 is a flowchart explaining operation of a timeout request issue processor.

FIGS. 4 to 8 are flowcharts explaining operation of the timeout request issue processor 93. FIG. 4 shows the whole process which the timeout request issue processor 93 undertakes. The timeout request issue processor 93 performs processing during a system call issued by the OS 22 to request a timeout. According to the present invention, reference is made to the status register SREG2 81b of the second timer TIM2 9b to decide whether interruption from the second timer TIM2 9b is enabled or disabled (decision step 124). In other words, a decision is made here as to whether or not counting is taking place according to the second timer TIM2 9b. If disabled (i.e. counting is taking place according to the first timer TIM1 9a), then the sequence proceeds to step 201; and if enabled (i.e. counting is taking place according to the second timer TIM2 9b), then the sequence proceeds to step 202.

Figure 5:
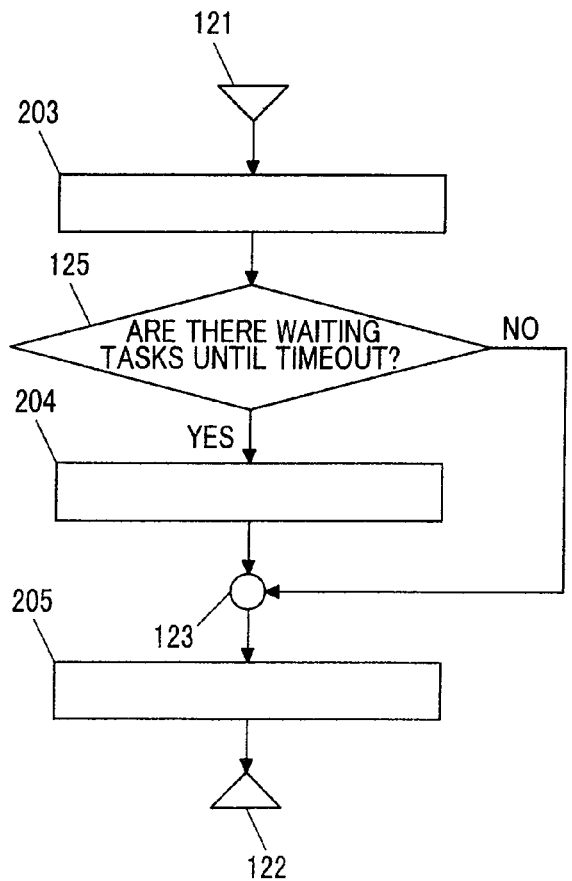
FIG. 5 is a flowchart explaining the process for step 201.

FIG. 5 is a flowchart explaining the process which is taken if interruption from the second timer TIM 9b is disabled. If it is decided at the decision step 124 that interruption from the second timer TIM2 9b is disabled, the remainder time from the present moment until the next interruption from the first timer TIM 9b is calculated and set on the first cycle supervisor 72. Specifically, the control register CREG2 82b is set so as to enable interruption from the second timer TIM2 9b; then the value of the counter CNT1 83a of the first timer TIM1 9a plus 1 is divided by the value of the timer cycle 44b set on the cycle register CYCREG2 84b of the second timer TIM2 9b plus 1 and the resulting quotient is stored in the first cycle supervisor 72 (step 203).

Next, a decision is made as to whether or not the timer queue header 106 of the TCB manager 92 points the memory address of TCB 109, namely whether or not there is a task waiting for timeout (hereinafter called a waiting task) (decision step 125). If it points the memory address of TCB 109 (i.e. there is a waiting task), the sequence proceeds to step 204; if not (i.e. there is no waiting task), the sequence proceeds to step 205.

Figure 6:
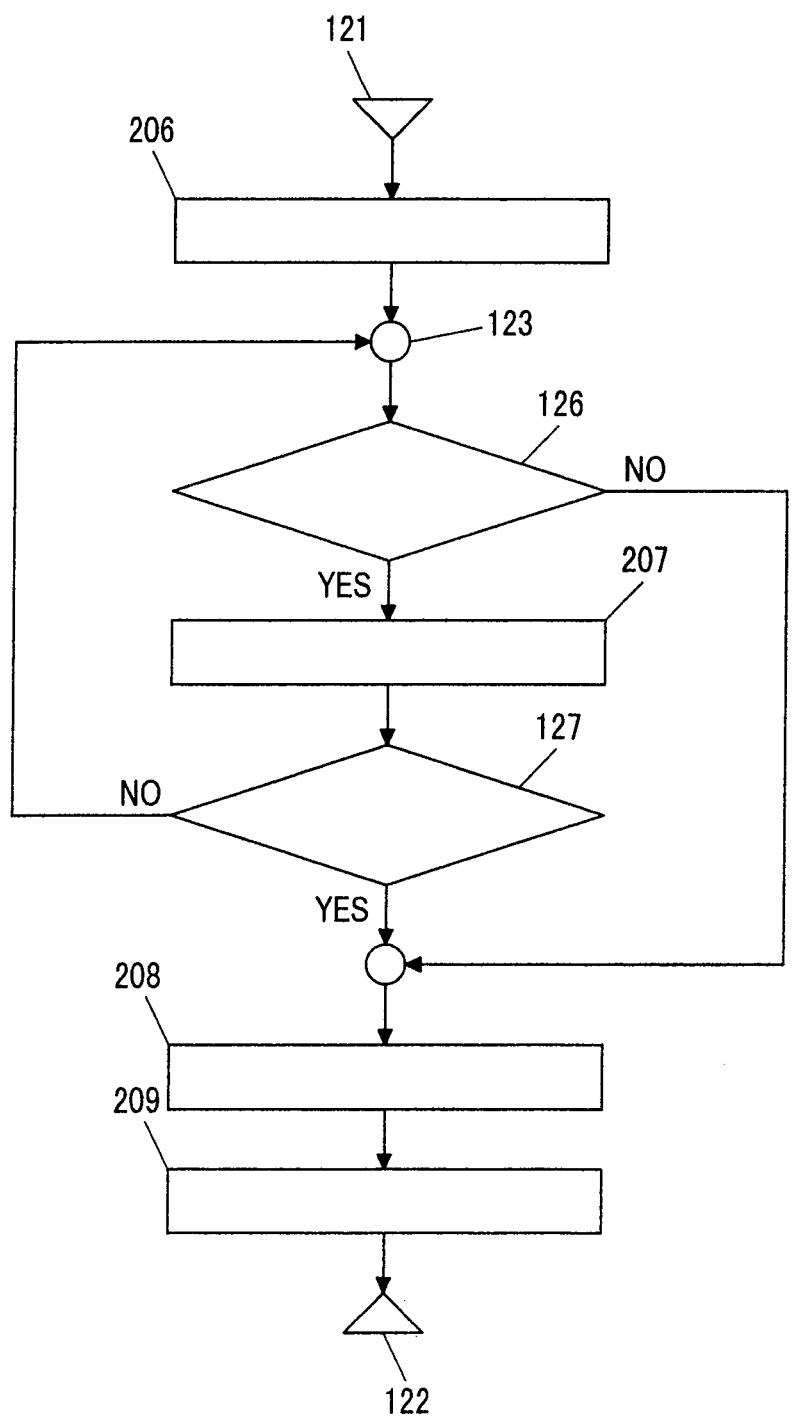
FIG. 6 is a flowchart explaining the process for step 204.

FIG. 6 is a flowchart explaining the process (step 204) of setting a timeout newly when there is a task waiting for timeout. If it is decided at the decision step 125 that there is a waiting task, in order to calculate the remainder time (before timeout) for the task which is to time out earliest, reference is first made to the first cycle supervisor 72 and the time supervision rate storage 73 and the value stored in the first cycle supervisor 72 is subtracted from the value stored in the time supervision rate storage 73. Then the resulting value is subtracted from the value stored in the timeout supervisor 71 for TCB 109 pointed by the processing pointer 101, and the resulting value is stored in the timeout supervisor 71 (step 206).

In order to compare the task newly set for timeout and the task previously set for timeout in terms of remainder time before timeout, a decision is made as to which is larger, the value stored in the timeout supervisor 71c of the new timeout-requesting TCB 109c or that in the timeout supervisor 71 of TCB 109 pointed by the processing pointer 101. The timeout supervisor 71c of the new timeout-requesting TCB 109c already stores a timeout request time duration 68. If the value in the timeout supervisor 71c is larger, the sequence proceeds to step 207; if it is smaller, the sequence proceeds to step 208. At this moment, TCB 109c is not inserted in the two-way list of the TCB manager 92.

If it is decided at the decision step 126 that the value stored in the timeout supervisor 71c of the new TCB 109c is larger than that in the timeout supervisor 71 of TCB 109 pointed by the processing pointer 101, the value stored in the timeout supervisor 71 of TCB 109 pointed by the processing pointer 101 is subtracted from the value stored in the timeout supervisor 71c of TCB 109c and the resulting value is stored in the timeout supervisor 71 of TCB 109c and the processing pointer 101 is set to the memory address of TCB 109 pointed by the forward pointer 107 of TCB 109 currently pointed by the processing pointer 101 so that the remainder time before timeout for the task newly set for timeout is temporarily updated (step 207).

Next, in order to decide whether or not remainder time before timeout for tasks previously set for timeout has all been investigated, a decision is made as to whether or not the processing pointer 101 points the memory address of the timer queue header 106, namely step 207 has been taken on TCB 109 connected with the timer queue (decision step 127). If it points the memory address of the timer queue header 106, then the sequence proceeds to step 208; if not, the sequence goes back to the decision step 126.

If it is decided at the decision step 127 that the processing pointer 101 points the memory address of the timer queue header 106, arrangements are made so that the memory address of TCB 109 pointed by the processing pointer 101 is replaced by the memory address of TCB 109c and the memory address of the previous TCB 109 is pointed by the forward pointer 107c of TCB 109c (step 208). This means that TCB 109c is inserted in the two-way list of the TCB manager 92. Arrangements are also made so that the backward pointer is inserted in the list.

Next, in order to update the remainder time before timeout for a task which is to time out next to the task newly inserted into the timer queue, the processing pointer 101 is set to the memory address of TCB 109 pointed by the forward pointer 107c of TCB 109c pointed by the insertion pointer 102; and the value calculated by subtracting the value stored in the timeout supervisor 71c for TCB 109c pointed by the insertion pointer 102 from the value in the timeout supervisor 71 for TCB 109 pointed previously by the processing pointer 101 is stored in the timeout supervisor 71 for TCB 109 pointed by the processing pointer 101 (step 209). In this way, the new TCB 109c is inserted in the processing routine.

Figure 7:
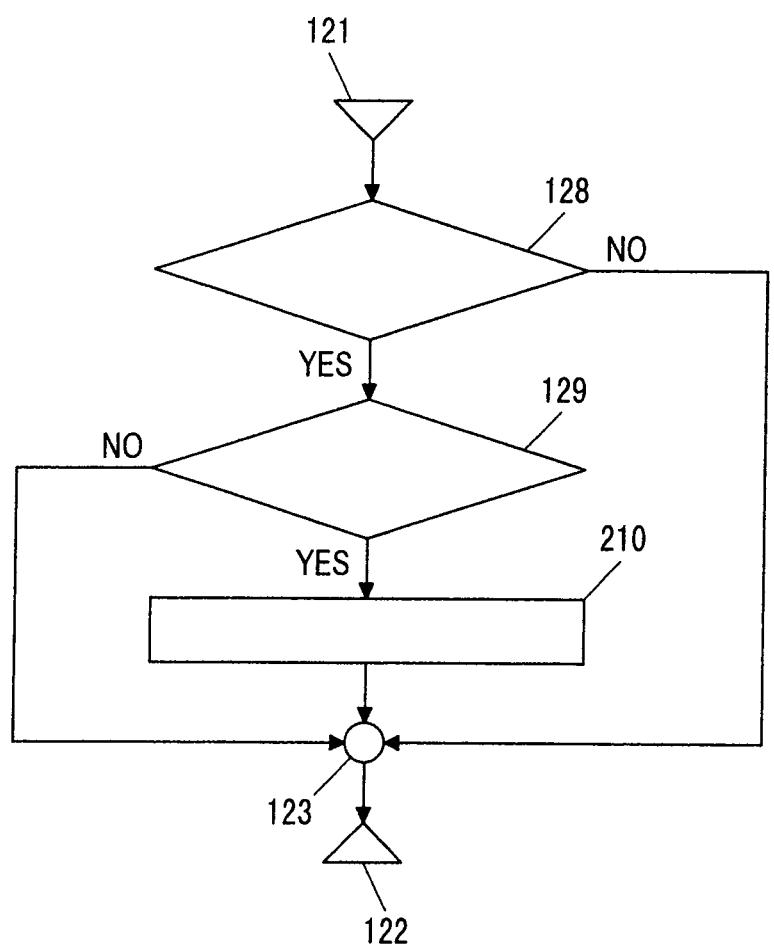
FIG. 7 is a flowchart explaining the process for step 205.

FIG. 7 is a flowchart explaining the process (step 205) in which the task newly set for timeout times out in the shortest time. First, in order to decide whether or not there is a task waiting for timeout other than the task newly set for timeout, a decision is made as to whether or not the backward pointer 108 of TCB 109 pointed by the insertion pointer 102 points the timer queue header 106 (decision step 128). If the backward pointer 108 of TCB 109 pointed by the insertion pointer 102 points the timer queue header 106, the sequence proceeds to the decision step 129; if not, the process (step 205) is ended.

If it is decided at the decision step 128 that the backward pointer 108 of TCB 109 pointed by the insertion pointer 102 points the timer queue header 106, a decision is made as to whether or not the value in the timeout supervisor 71 of TCB 109 pointed by the insertion pointer 102 is larger than the value in the first cycle supervisor 72, in order to decide which is larger, the remainder time for the task newly set for timeout or the value in the first cycle supervisor (decision step 129). If the value in the timeout supervisor 71 of TCB 109 pointed by the insertion pointer 102 is larger than the value in the first cycle supervisor 72, the sequence proceeds to step 210; if not, step 205 is ended. At step 210, in order to disable interruption from the first timer TIM1 9a, the control register CREG2 82b of the second timer TIM2 9b is set so as to disable interruption from the second timer TIM2 9b.

Figure 8:
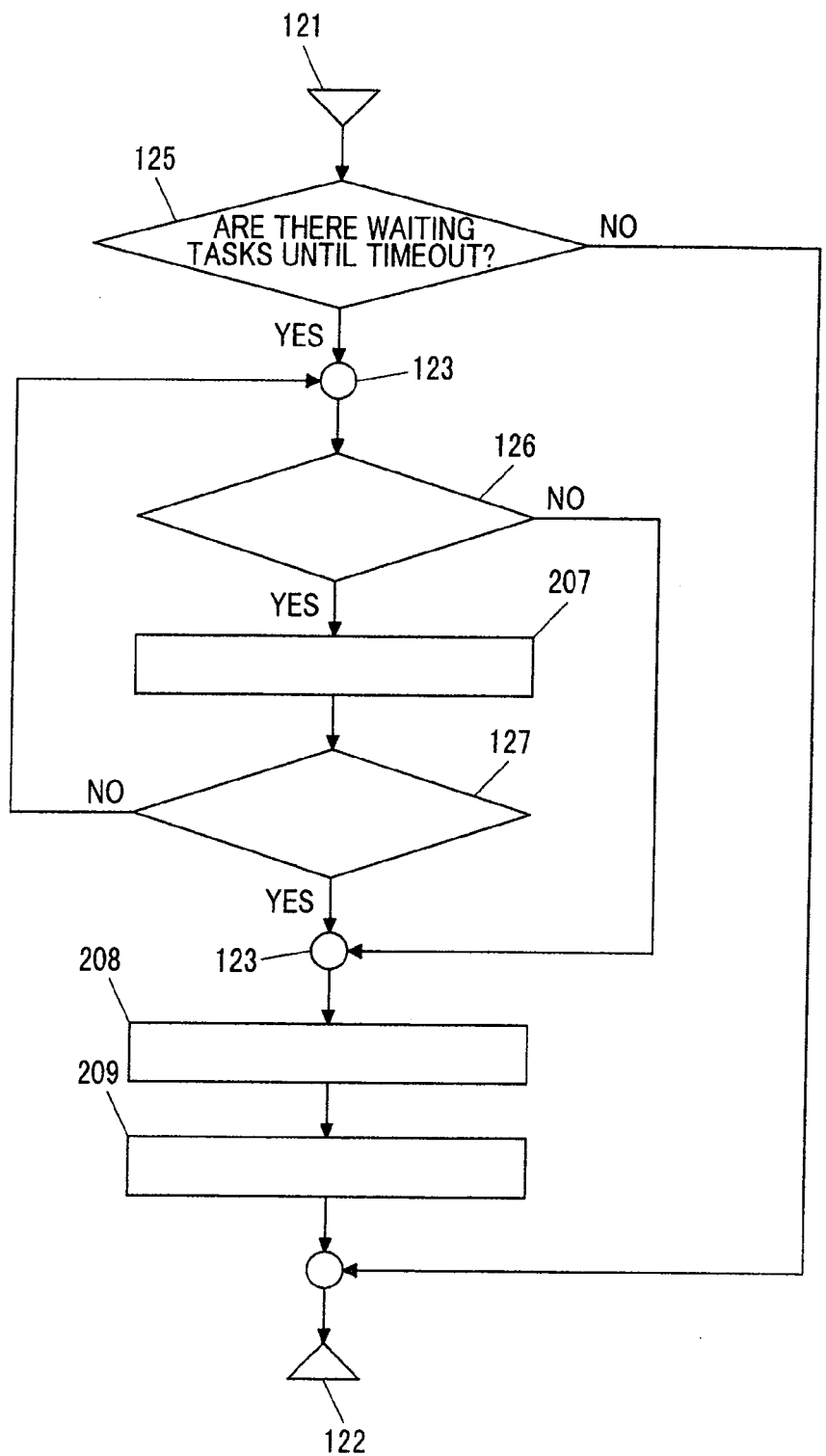
FIG. 8 is a flowchart explaining the process for step 202.

FIG. 8 is a flowchart explaining step 202. Step 202 is a process which is followed if it is found by reference to the status register SREG 81b of the second timer TIM2 9b that interruption from the second timer TIM2 9b is enabled (see FIG. 4). Because step 202 is similar to the steps described above with reference to FIG. 5 and FIG. 12, its description is omitted here.

Figure 9:
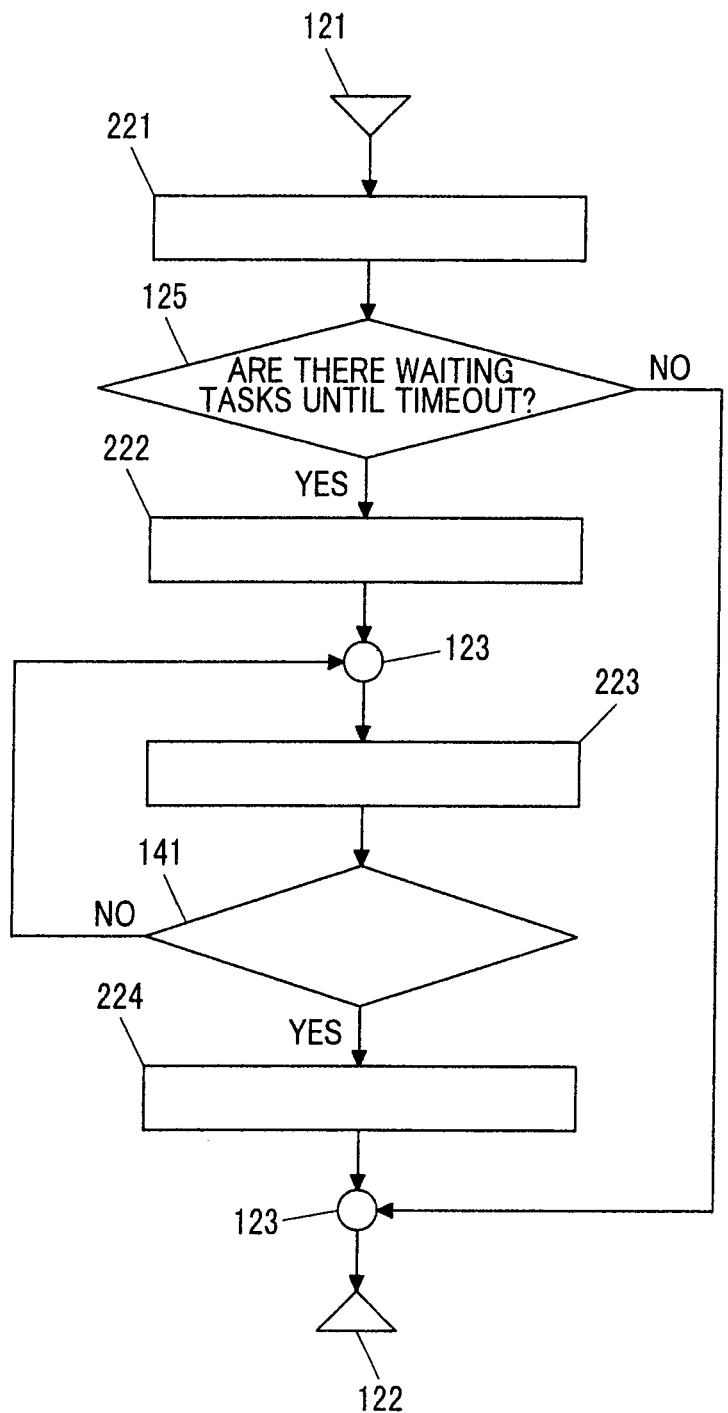
FIG. 9 is a flowchart explaining operation of a first timer interruption processor.
Figure 10:
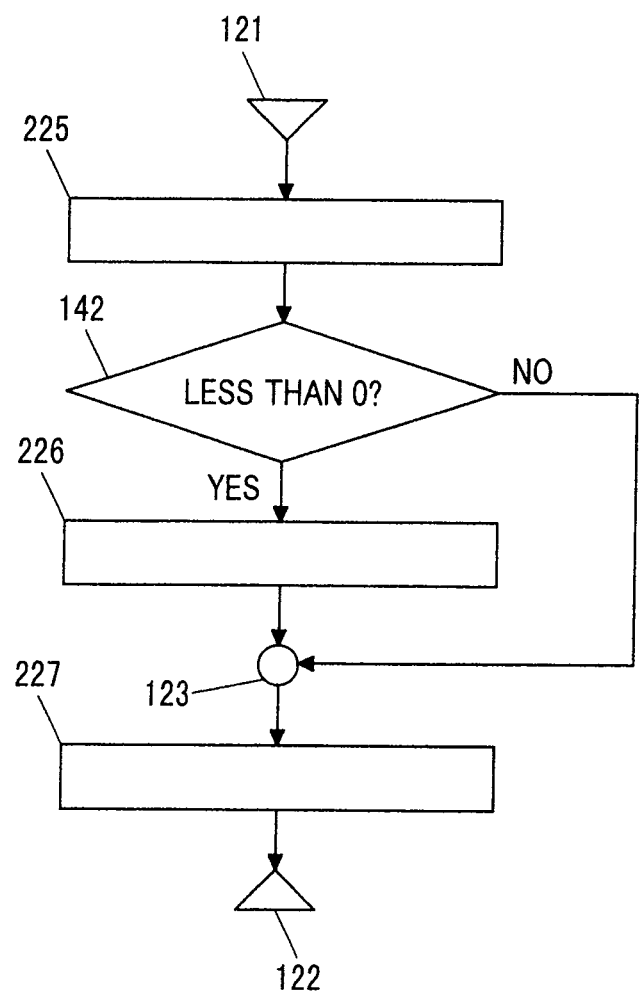
FIG. 10 is a flowchart explaining the process for step 223.

FIG. 9 is a flowchart explaining operation of the first timer interruption processor. When interruption 65a from the first timer occurs, the first timer interruption processor 94 takes the following steps to start the processor 1. First, in order to set the first timer cycle on the first cycle supervisor 72, both the first timer TIM1 9a and the second timer TIM2 9b are set by the control registers SREG 82 so as to prevent the counters CNT from underflowing; then the value in the first cycle supervisor 72 is stored in the temporary storage 103 and the value stored in the time supervision rate storage 73 is stored in the first cycle supervisor 72 (step 221).

Next, in order to decide whether or not there is a task waiting for timeout, a decision is made as to whether or not the timer queue header 106 of the TCB manager 92 points the memory address of TCB 109, namely there is a waiting task (decision step 125).

If it is decided at the decision step 125 that the timer queue header 106 points the memory address of TCB 109, then in order to update the remainder time before timeout for the task which is to time out earliest, the processing pointer 101 is set to the memory address of TCB 109 pointed by the forward pointer 107 of the timer queue header 106 and the value calculated by subtracting the value stored in the temporary storage 103 from the value stored in the timeout supervisor 71 for TCB 109 pointed by the processing pointer 101 is substituted into the timeout supervisor 71 for TCB 109 pointed by the processing pointer 101 (step 222).

The next step is a timeout process for the task which is to time out earliest (step 223). The process (step 223) is described referring to FIG. 10. First, in order to switch from the processing pointer for timeout request issue to the processing pointer for timer interruption, the processing pointer 101b is set so as to point the same memory address as the memory address of TCB 109 pointed by the processing pointer 101a (step 225). Then, in order to decide whether or not it is time to time out, a decision is made as to whether or not the value in the timeout supervisor 71 for TCB 109 pointed by the processing pointer 101a is zero or less (decision step 142). If it is zero or less, the sequence proceeds to step 226; if not, the sequence proceeds to step 227. If it is decided at the decision step 142 that the value in the timeout supervisor 71 is zero or less, TCB 109 pointed by the processing pointer 101a is deleted from the two-way list of the TCB manager 92 and disposition of the two-way list of the TCB manager 92 is done in order to remove TCB 109 from the timer queue and let it time out (step 226).

Then, the processing pointer 101a is set so as to point the memory address of TCB 109 pointed by the forward pointer 108 of TCB 109 pointed by the processing pointer 101b for shift to the TCB which is to time out next for timeout processing (step 227).

After the end of step 227 (after the end of step 223 in FIG. 9), in order to decide whether or not the timeout statuses of waiting tasks have all been investigated, a decision is made as to whether or not the processing pointer 101b points the memory address of the timer queue header 107 (decision step 141). If so, the sequence proceeds to step 224; if not, the sequence goes back to step 223.

Figure 11:
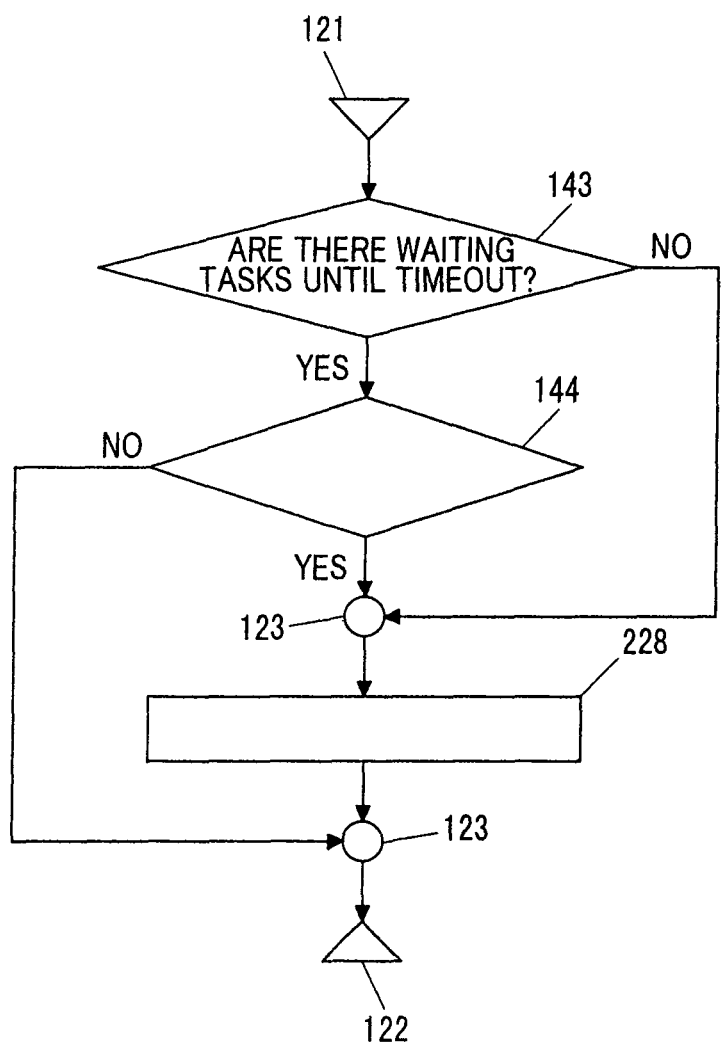
FIG. 11 is a flowchart explaining the process for step 224.

FIG. 11 is a flowchart explaining step 224. First, in order to decide whether there is a waiting task, a decision is made as to whether the forward pointer 107 of the timer queue header 106 points the memory address of the timer queue header 106 (decision step 143). If so, the sequence proceeds to step 228; if not, it proceeds to a decision step 144.

If it is decided at the decision step 143 that the forward pointer 107 does not point the memory address of the timer queue header 106, a decision is made as to whether or not the value stored in the timeout supervisor 71 for TCB 82 pointed by the forward pointer 83 of the timer queue header 106 is larger than the value in the first cycle supervisor 72, in order to decide whether the remainder time before timeout for the task which is to time out earliest is larger than the value in the first cycle supervisor (decision step 144). If it is larger than the value in the first cycle supervisor 72, the sequence proceeds to step 228; if not, step 224 is ended.

If it is decided at the decision step 143 that the forward pointer 107 points the memory address of the timer queue header 106, or at the decision step 144 that the value stored in the timeout supervisor 71 is larger than the value in the first cycle supervisor 72, the control register 82b is set so as to disable interruption from the second timer 9b and step 228 and step 224 are ended.

Figure 12:
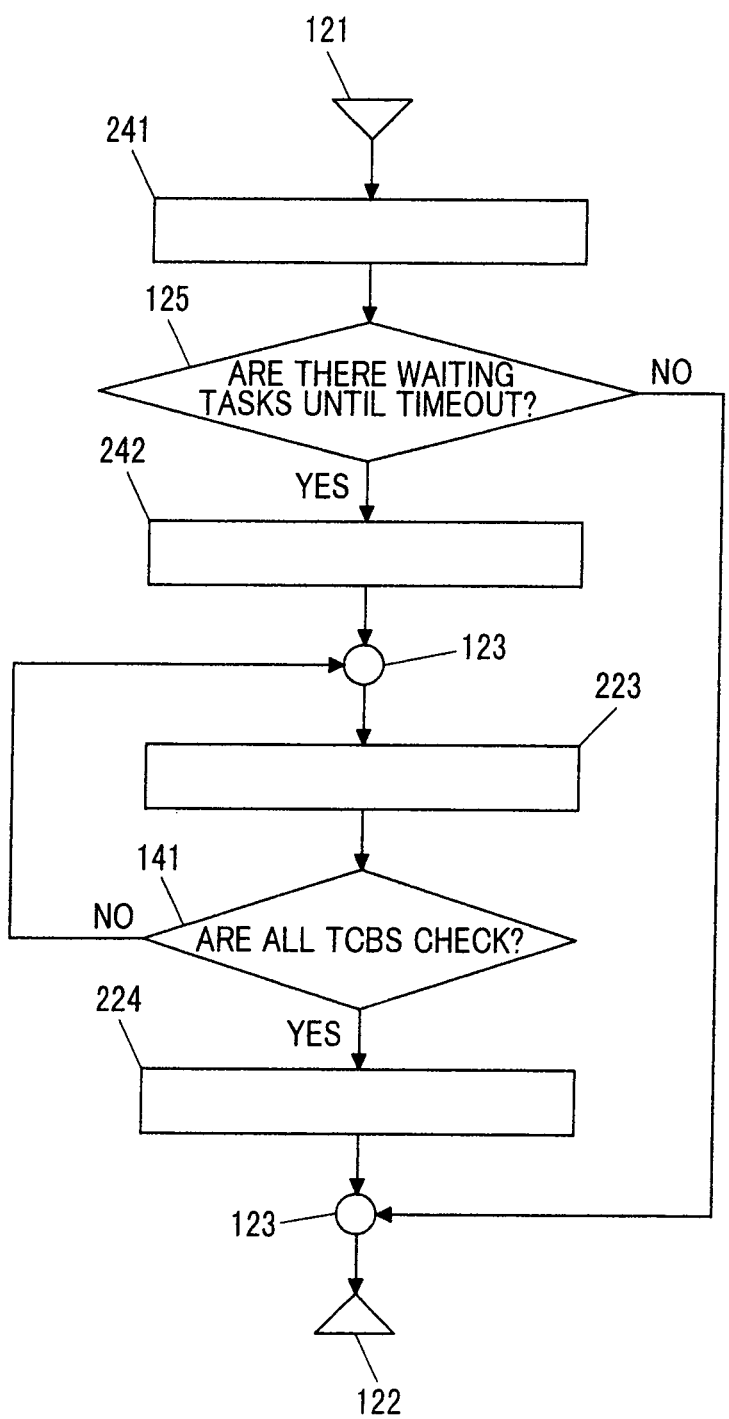
FIG. 12 is a flowchart explaining operation of a second timer interruption processor.

FIG. 12 is a flowchart explaining operation of the second timer interruption processor. The second timer interruption processor 95 starts the processor 1 when interruption from the second timer occurs (65b). First, in order to update the first cycle supervisor, the control register 82b of the second timer 9b is set so as to prevent the counter 83b from underflowing and the second timer cycle 44b is subtracted from the value stored in the first cycle supervisor 72 and the resulting value is substituted into the first cycle supervisor 75 (step 241).

Then, in order to update the remainder time for the task which is to time out earliest, the memory address of the TCB 109 pointed by the forward pointer 107 of the timer queue header 106 is substituted into the processing pointer 101a. Then the value calculated by subtracting the second timer cycle 44b from the value stored in the timeout supervisor 71 for the TCB 109 pointed by the processing pointer 101a is substituted into the timeout supervisor 71 for TCB 109 pointed by the processing pointer 101a (step 242).

Next, decision step 125, step 223, step 224 and decision step 141 are taken. Since these steps have already been described with reference to FIG. 9, their descriptions are omitted here.

The above-mentioned processing sequence is followed to implement the present invention, providing an information processing device which features reduced power consumption and quicker response.

The above embodiment of the present invention has been explained on the assumption that the timers 9 are down-counters; however, the same principles of operation apply to the case that the timers 9 are up-counters.

Figure 13:
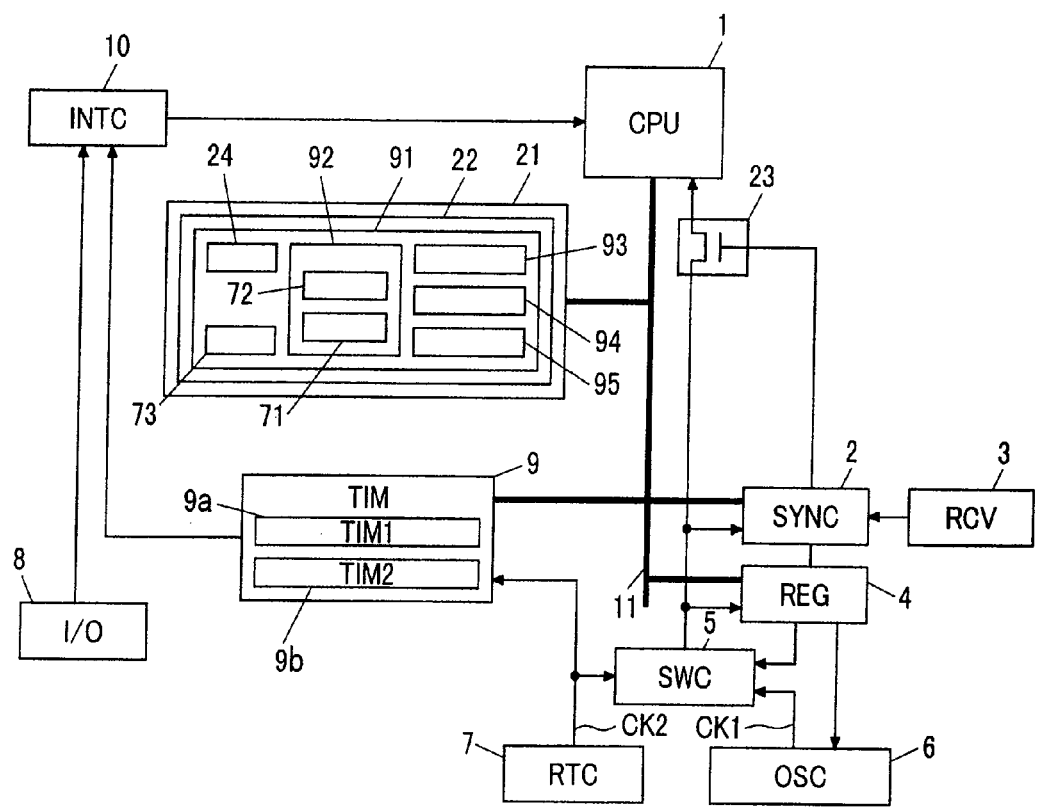
FIG. 13 illustrates an information processing device according to the present invention.
Figure 14:
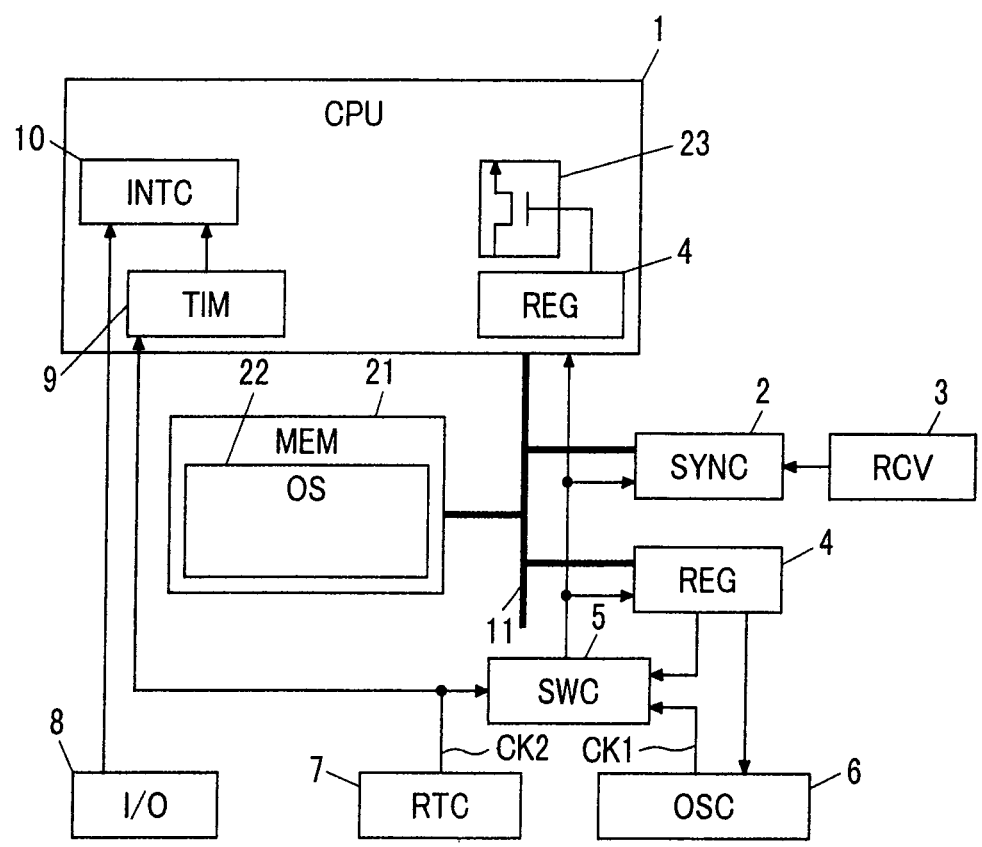
FIG. 14 illustrates an information processing device whose CPU incorporates timers and standby power reduction mode components.

FIG. 13 illustrates an information processing device, particularly as a mobile terminal, according to the present invention. The present invention may be easily embodied as an information processing device without the need for hardware modification on condition that the device has two timers TIM 9 (two channels) and the functionality of the OS, or software, is appropriately modified. However, by replacing some software functions by hardware components, higher speed processing may be achieved. As illustrated in FIG. 14, the timers and standby power reduction mode components may be incorporated in the CPU. In this case, the information processing device can be more compact.

Figure 15:
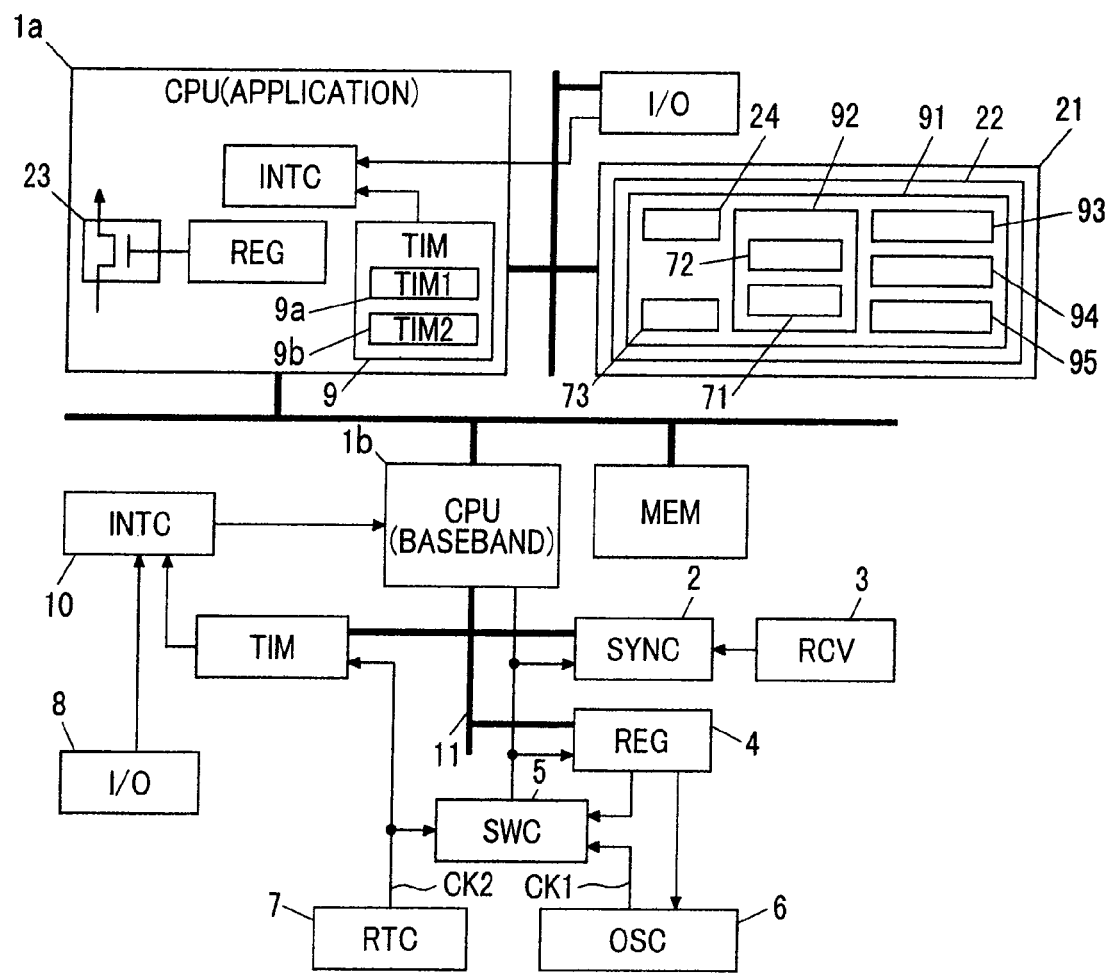
FIG. 15 illustrates an information processing device with a processor according to the present invention.
Figure 16:
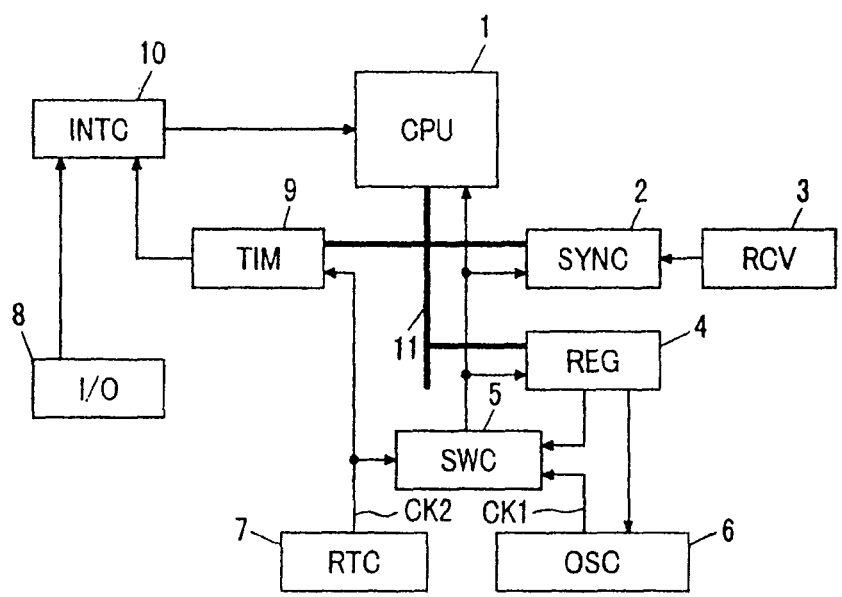
FIG. 16 illustrates a conventional wireless communication device.
Figure 17:
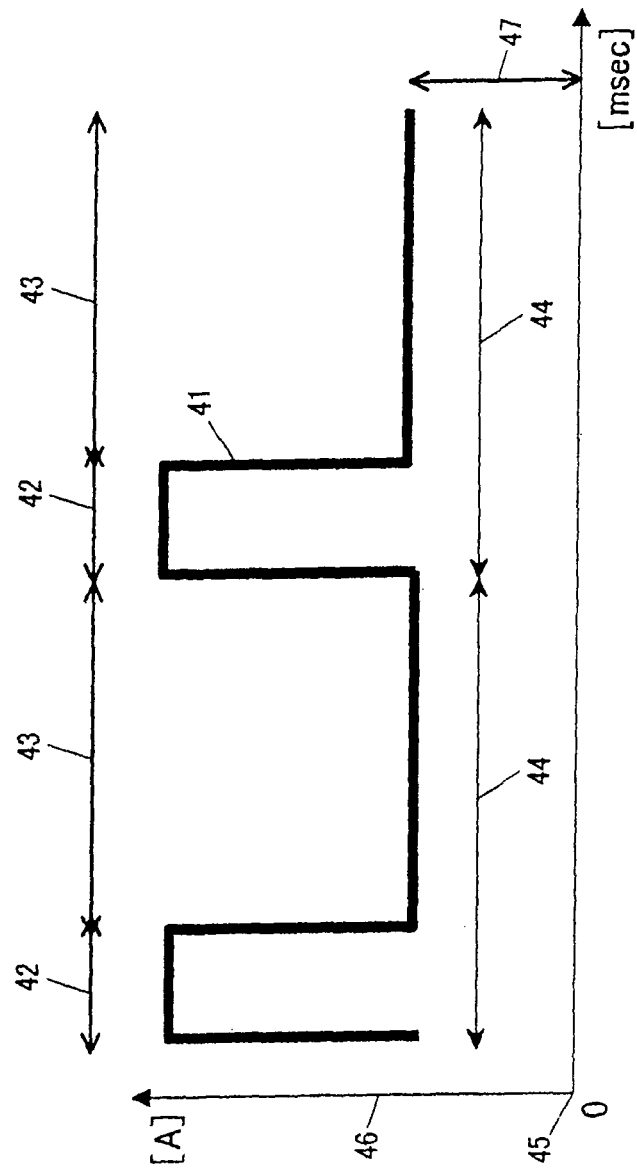
FIG. 17 is a graph explaining the problems of a conventional device.

FIG. 15 illustrates an information processing device according to a second embodiment of the present invention. In a typical communication device like a mobile phone, both communication and multimedia processing must be done simultaneously, which imposes a heavy load on the processor.

Therefore, in this embodiment, the information processing device incorporates a baseband processor for communications 1b and an application processor for multimedia 1a. The present invention can be applied to both the baseband processor 1b and the application processor 1a. The baseband processor 1b consumes less power than the application processor 1a. For this reason, in the device illustrated in FIG. 15, the present invention is applied only to the application processor 1a and not to the baseband processor 1b. In this constitution, the capacity of the memory MEM 21b of the baseband processor 1b may be smaller and the information processing device may be compact.

As discussed so far, the present invention may be embodied to assure power consumption reduction and quicker interruption response in an information processing device.

What is claimed is:

1. An information processing device which specifies a waiting time until execution of a given event and makes a system call, said information processing device comprising:
   a first timer which is set for a first cycle; and
   a second timer which is set for a second cycle which is shorter than the first cycle,
   wherein the waiting time is stored as a result of subtraction of a second waiting time from a first waiting time upon an interruption request from said first timer,
   wherein the first waiting time is a waiting time when the system call is made,
   wherein the second waiting time is a time until the next interruption request from said first timer when the system call is made,
   wherein, if the first waiting time is shorter than the first cycle, then the second cycle is subtracted from the first waiting time upon an interruption request from said second timer, and
   wherein, if the result of subtraction of the second cycle from the first waiting time is zero or less, then the given event is executed.

2. The information processing device according to claim 1,
   wherein, if the first waiting time is longer than the first cycle, then an interruption request from said second timer is disabled, and
   wherein, if the first waiting time is shorter than the first cycle, then an interruption request from said second timer is enabled.

3. The information processing device according to claim 2,
   wherein said information processing device enables input of the waiting time duration of the first cycle.

4. The information processing device according to claim 1,
   wherein said first and second timers operate in accordance with the same clock, and
   wherein the first cycle is an integral multiple of the second cycle.

* * * * *